(12) United States Patent
Fukuda

(10) Patent No.: US 6,902,504 B2
(45) Date of Patent: Jun. 7, 2005

(54) CAGE PLATE ADJUSTING MECHANISM FOR A BICYCLE REAR DERAILLEUR

(75) Inventor: Masahiko Fukuda, Amagasaki (JP)

(73) Assignee: Shimano Inc., Osaka (JP)

( * ) Notice: Subject to any disclaimer, the term of this patent is extended or adjusted under 35 U.S.C. 154(b) by 201 days.

(21) Appl. No.: 10/327,934

(22) Filed: Dec. 26, 2002

(65) Prior Publication Data
US 2004/0127315 A1 Jul. 1, 2004

(51) Int. Cl.$^7$ ............................................... F16H 11/08
(52) U.S. Cl. ........................................... 474/83; 403/13
(58) Field of Search ................................ 403/13, 109.3, 403/109.6; 474/78, 80, 81, 82, 83

(56) References Cited

U.S. PATENT DOCUMENTS

| | | | | |
|---|---|---|---|---|
| 4,037,484 A | * | 7/1977 | Morse | 474/82 |
| 4,406,643 A | | 9/1983 | Shimano | |
| 4,530,677 A | | 7/1985 | Nagano | |
| 4,534,374 A | * | 8/1985 | Day | 135/22 |
| 4,833,937 A | | 5/1989 | Nagano | |
| 4,850,940 A | | 7/1989 | Nagano | |
| 5,498,211 A | * | 3/1996 | Hsu | 474/80 |
| 5,836,844 A | | 11/1998 | Yoshida | |
| 5,961,409 A | * | 10/1999 | Ando | 474/82 |
| 6,394,921 B1 | | 5/2002 | Fukuda | |

FOREIGN PATENT DOCUMENTS

| | | | |
|---|---|---|---|
| EP | 0 032 049 A2 | 7/1981 | |
| FR | 2652329 A1 | * 3/1991 | ............ B62M/9/16 |

* cited by examiner

Primary Examiner—David A. Bucci
Assistant Examiner—Vicky A. Johnson
(74) Attorney, Agent, or Firm—Shinjyu Global IP Counselors, LLP

(57) ABSTRACT

An adjusting mechanism is provided for a bicycle derailleur, which can adjust a position of a chain guide in an axial direction. The derailleur basically has a base member, a movable member with the chain guide and a linkage assembly. The adjustment mechanism is preferably operatively coupled between the movable member and the chain guide, or between the base member and the frame. The adjusting mechanism includes a first tubular portion, a second tubular portion, a biasing member and an adjustment member. The second tubular portion is arranged around the first tubular portion to move axially relative to the first tubular portion via the adjustment member. The biasing member is arranged to apply an urging force on the tubular portions. One of the tubular portions has a rigid non-compressible support projection arranged to selectively contact the other tubular portion when the tubular portions move relative to each.

32 Claims, 14 Drawing Sheets

CAGE PLATE ADJUSTING MECHANISM FOR A BICYCLE REAR DERAILLEUR

BACKGROUND OF THE INVENTION

1. Field of the Invention

This invention generally relates to a rear derailleur for a bicycle. More specifically, the present invention relates to an adjusting mechanism for adjusting the position of the chain guide in an axial direction with respect to a multistage sprocket assembly of the bicycle.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle as well as the frame of the bicycle. One component that has been extensively redesigned is the drive train of the bicycle.

Most of today's bicycles are multi-speed bicycles that allow the rider to select the appropriate gear ratio to suit the particular riding conditions encountered during the bicycle ride. One of the most popular types of gearing assemblies for multi-speed bicycles utilize a chain extending between a set of front sprockets mounted for rotation with the pedals and a set of rear sprockets mounted on the rear hub of the rear bicycle wheel for rotation therewith. Two derailleurs are typically used to move the chain between the sprockets or gears. Generally, most derailleurs (front or rear derailleurs) include a fixed or base member secured to a bicycle frame, and a movable member with a chain guide that is supported for movement relative to the fixed or base member by a linkage assembly. The chain guide has a pair of guide plates that form a chain receiving slot for contacting and moving a chain between the sprockets.

In the case of a rear derailleur, the chain guide has a pair of pulleys that are rotatably mounted between the guide plates. Also the base member of a rear derailleur is supported swingably to the bicycle frame through a horizontal shaft or axle, and the chain guide is swingably mounted to the movable member through a horizontal shaft or axle. A spring is interposed between the movable member and the chain guide for applying tension to the chain guide. The base member is fixed to a fork end of the bicycle frame, with the chain guide being disposed radially outwardly of the multistage sprocket assembly.

When the rider operates the shift operating device of the front derailleur shifting mechanism, the operating conduit or cable pulls the chain guide of the front derailleur such that the chain is moved outwardly from one gear or sprocket to the next gear or sprocket, or releases the front derailleur such that the chain is moved inwardly from one gear or sprocket to the next gear or sprocket. Likewise, when the rider operates the shift operating device of the rear derailleur shifting mechanism, the operating conduit or cable pulls the rear derailleur such that it moves the chain inwardly/outwardly from one gear or sprocket to the next gear or sprocket, or releases the rear derailleur such that it moves the chain outwardly/inwardly from one gear or sprocket to the next gear or sprocket. Typically, there are top-normal and low-normal type rear derailleurs, which are normally biased in outward and inward directions, respectively. Thus, while the front derailleur will move inwardly towards the center of the bicycle when its operating conduit or able is released, the rear derailleur will move outwardly or inwardly relative the center of the bicycle when its operating conduit or able is released, depending on if the rear derailleur is a top-normal or low-normal type.

The conventional derailleur which includes a chain guide capable of being adjusted in its axial position with respect to the multistage sprocket assembly is well-known as disclosed in U.S. Pat. No. 4,850,940 to Nagano and assigned to Shimano, Inc. Specifically, Shimano's prior U.S. Pat. No. 4,850,940 shows an adjusting mechanism for a chain guide which has a housing or movable member non-rotatably mounted on a tubular member via an adjusting screw. The tubular member is coupled to the chain guide via a fixing pin and bushing. A spring is disposed inside the tubular member to rotationally bias the tubular member and housing. The housing has an outer cylindrical portion that is slidable on the tubular member. The housing is not coupled to the fixing pin. Because the outer cylindrical portion is sized to slide on the tubular member and the housing is not coupled to the fixing pin, some play or looseness exists between these members. Also, due to this looseness, the housing can vibrate on the tubular member. Such vibrations can cause the adjusting screw to rotate undesirably. Such rotation of the adjusting screw can allow the chain guide to be out of alignment with the free wheel sprockets.

In view of the above, there exists a need for derailleur with an adjusting mechanism which overcomes the above mentioned problems in the prior art. This invention addresses this need in the prior art as well as other needs, which will become apparent to those skilled in the art from this disclosure.

SUMMARY OF THE INVENTION

One object of the present invention is to provide an adjusting mechanism for a rear derailleur that has less play than adjusting mechanisms of the prior art.

Another object of the present invention is to provide an adjusting mechanism for a rear derailleur that is simple and inexpensive to manufacture and assemble.

Another object of the present invention is to provide an adjustment mechanism for a rear derailleur that has an anti-loosening mechanism.

The foregoing objects of the present invention can basically be attained by providing an adjusting mechanism for adjusting a position of a chain guide of a bicycle derailleur in an axial direction. The adjusting mechanism basically comprises an axle, a first tubular portion, a housing, a biasing member and an adjustment mechanism. The axle has a first end and a second end with a longitudinal axis extending between the first and second ends. The first tubular portion is pivotally coupled on the axle to rotate about the longitudinal axis. The housing has an attachment portion adapted to be coupled to a linkage assembly of the bicycle derailleur and a second tubular portion arranged around the first tubular portion. The second tubular portion is non-rotatably arranged relative to the first tubular portion. The biasing member is arranged to apply an urging force on the first and second tubular portions about the axle. The adjustment member is operatively coupled between the housing and the first tubular portion to move the housing relative to the first tubular portion in an axial direction on the axle. One of the first and second tubular portions has a rigid non-compressible support projection arranged to selectively contact the other of the first and second tubular portions when the first and second tubular portions move relative to each other from non-contacting positions to contacting positions.

The foregoing objects can also basically be attained by providing a derailleur for a bicycle that comprises a base member, a movable member, a linkage assembly and an adjustment mechanism. The base member is adapted to be coupled to a part of the bicycle and is pivotally supported on a first axle with a base element. The movable member is adapted to shift a chain of the bicycle in a transverse direction. The movable member is pivotally supported on a second axle coupled to a plate element of a chain guide. The linkage assembly is movably coupled between the base member and the movable member to move the chain guide between a retracted position and an extended position. One of the members has an adjusting mechanism that movably supports it in an axial direction relative to a corresponding one of the elements on a corresponding one of the axles. The adjusting mechanism includes a first tubular portion, a second tubular portion, a biasing member and an adjustment member. The first tubular portion extends from the corresponding one of the elements and is pivotally coupled on the corresponding one of the axles. The second tubular portion extends from the one of the members and is arranged around the first tubular portion. The second tubular portion is non-rotatably arranged relative to the first tubular portion and is fixed to move axially with the one of the members. The biasing member is coupled between the one of the members and the corresponding one of the elements to apply an urging force between the one of the members and the corresponding one of the elements about the corresponding one of the axles. The adjustment member is operatively coupled between the first and second tubular portions to move the one of the members relative to the first tubular portion in an axial direction on the corresponding one of the axles. One of the first and second tubular portions has a rigid non-compressible support projection arranged to selectively contact the other of the first and second tubular portions when the first and second tubular portions move relative to each other from non-contacting positions to contacting positions.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
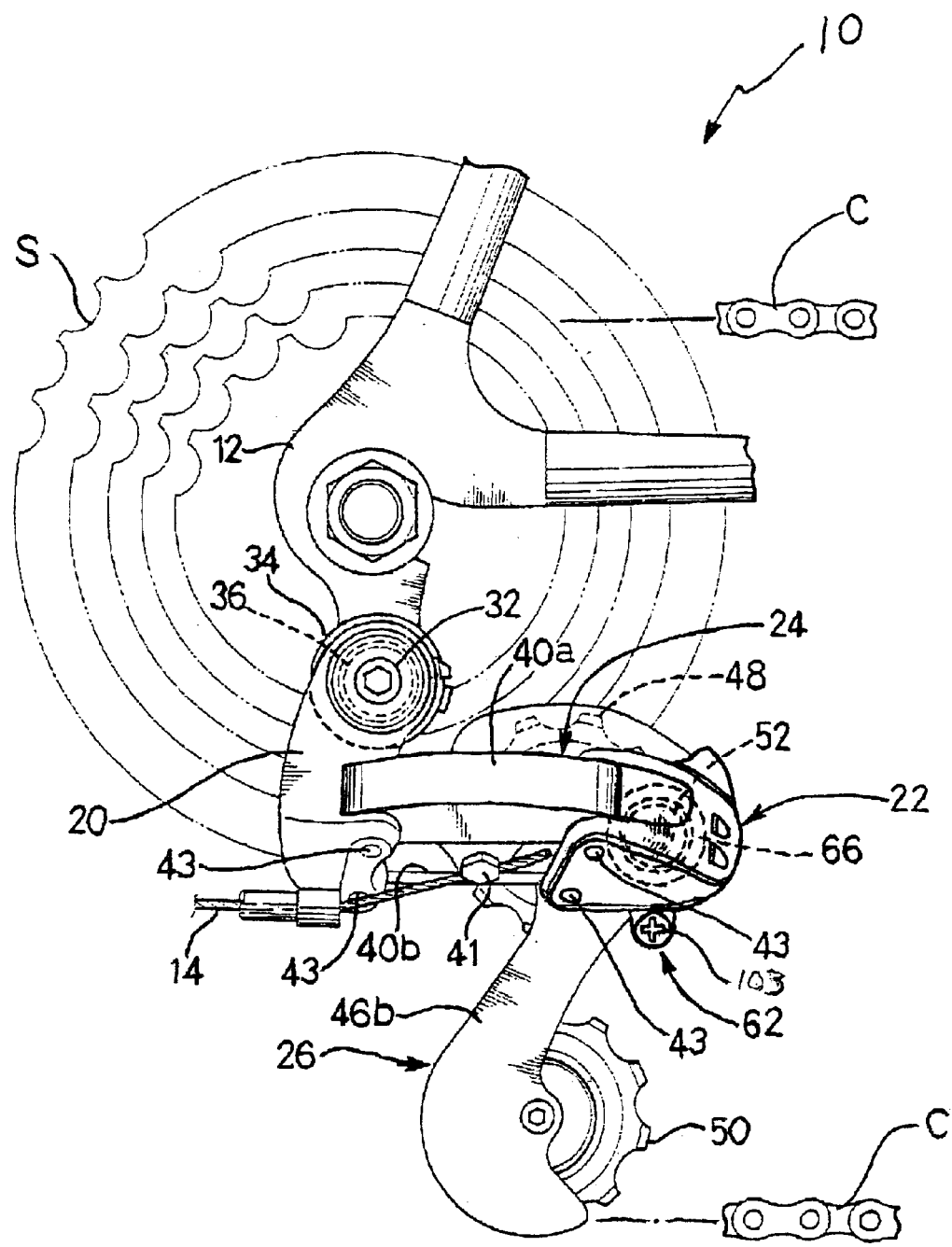
FIG. 1 is a partial side elevational view of a portion of a conventional bicycle with a rear derailleur coupled thereto in accordance with one embodiment of the present invention.
Figure 2:
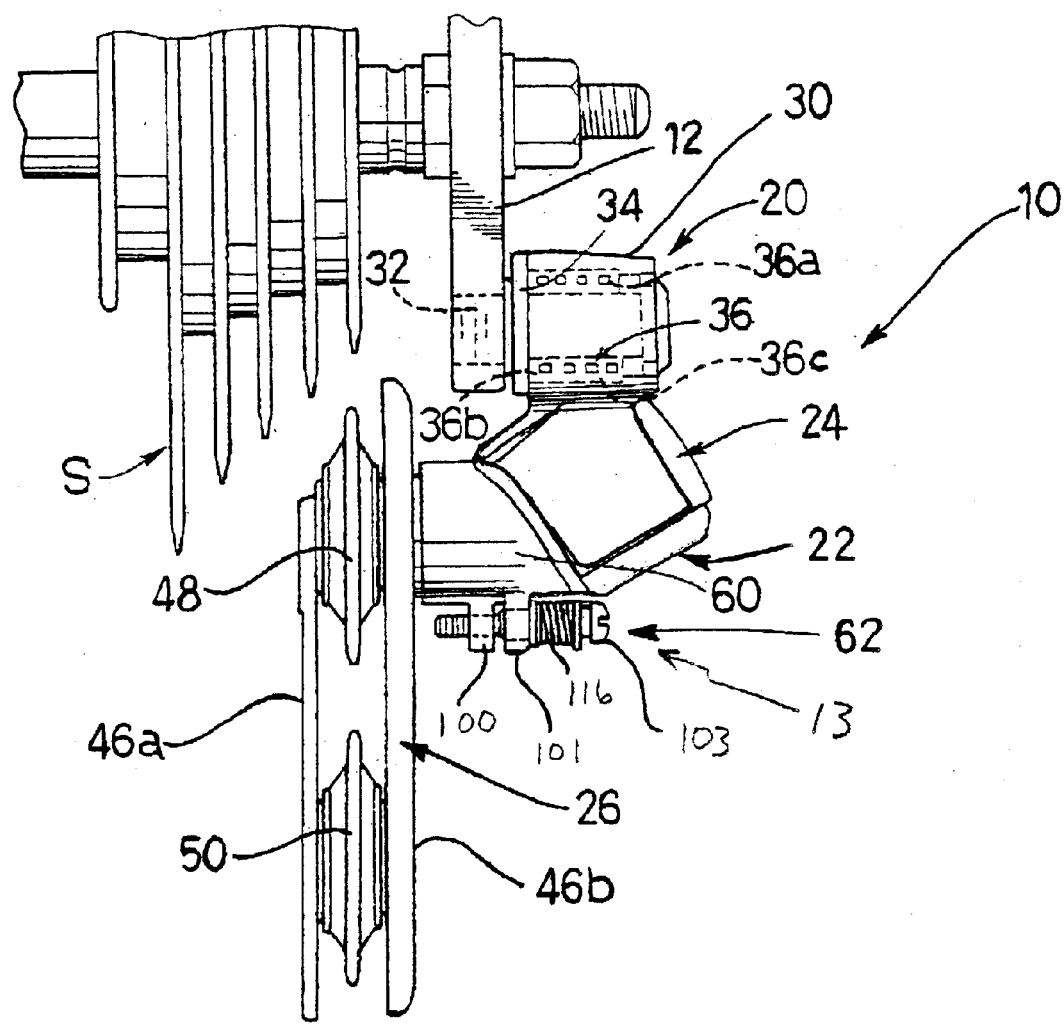
FIG. 2 is a partial rear end elevational view of the bicycle illustrated in FIG. 1 with the rear derailleur in accordance with the present invention mounted on the frame of the bicycle.
Figure 3:
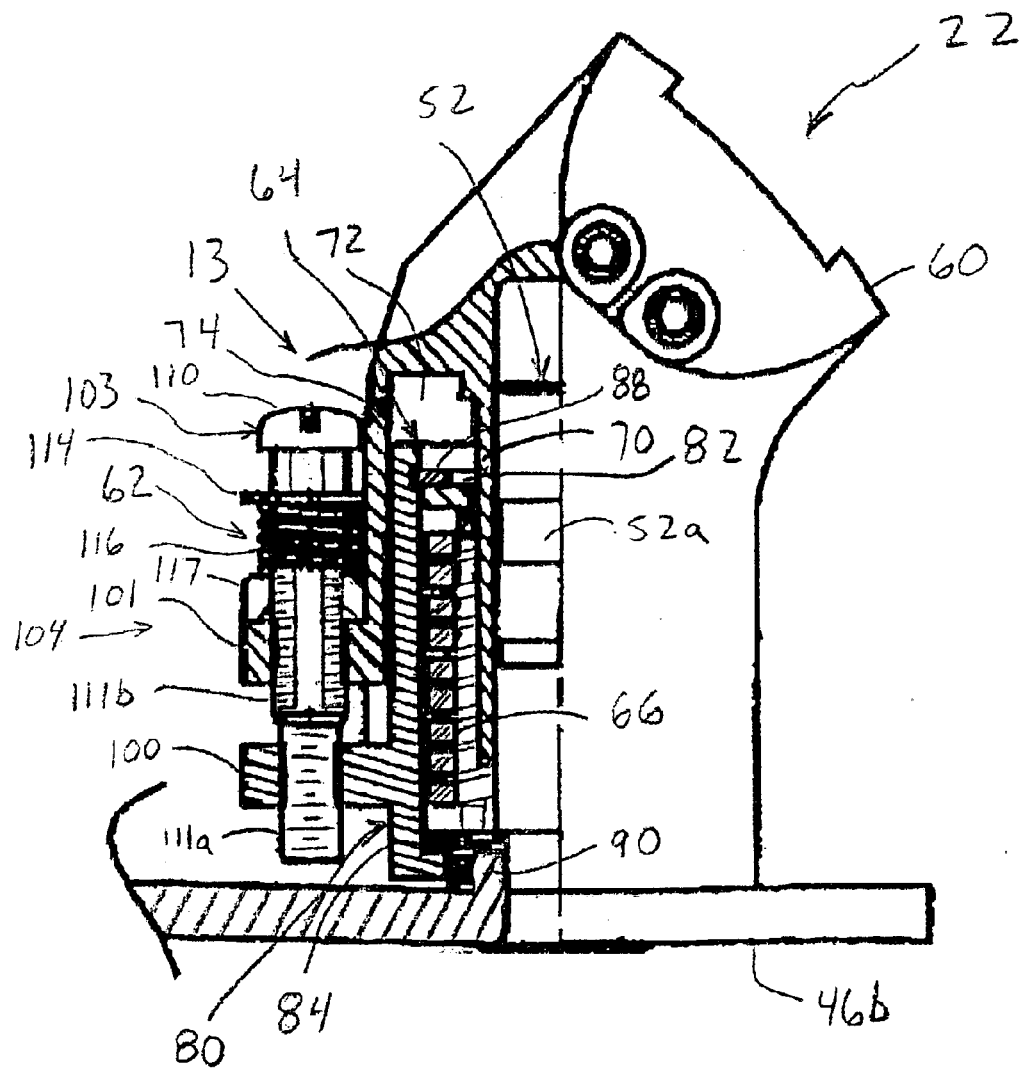
FIG. 3 is a partial cross sectional view of the movable member of the rear derailleur illustrated in FIGS. 1 and 2 in accordance with the present invention with certain portions broken away for the purposes of illustration.
Figure 4:
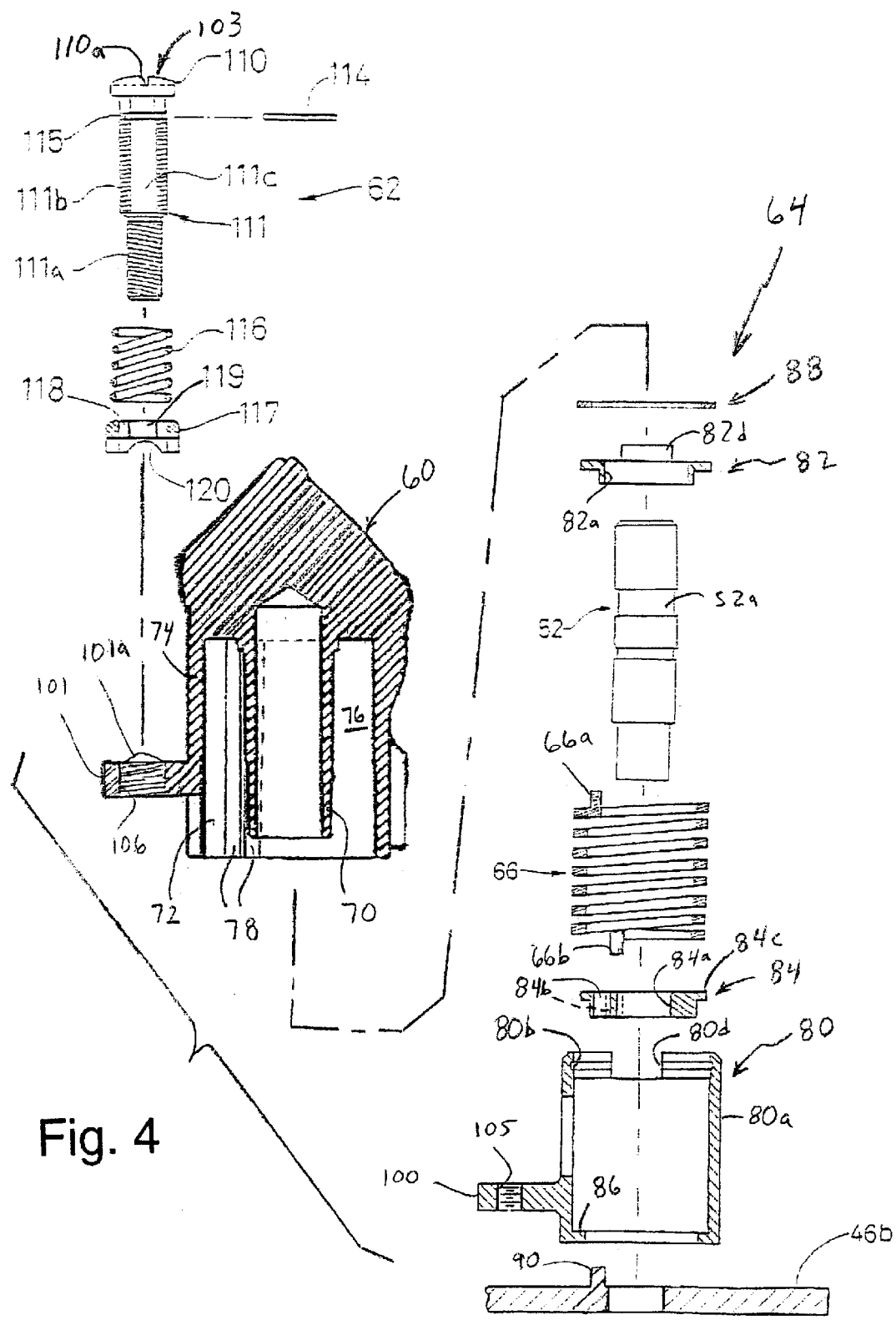
FIG. 4 is an exploded cross-sectional view of the movable member illustrated in FIG. 3 in accordance with the present invention.
Figure 5:
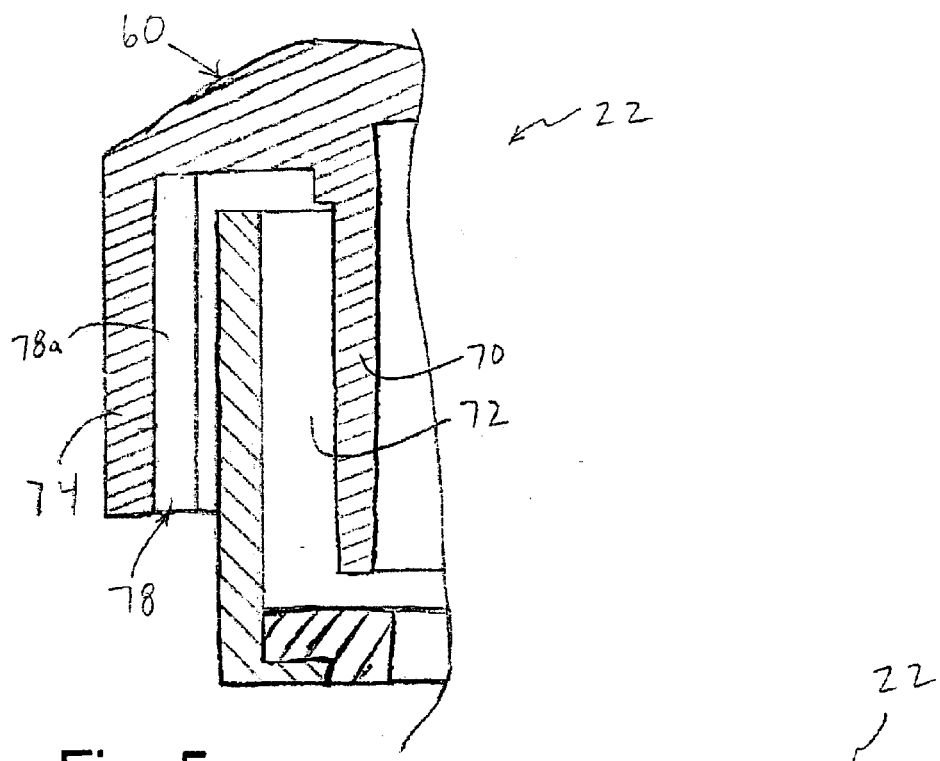
FIG. 5 is an enlarged, partial cross-sectional view of the movable member illustrated in FIGS. 3 and 4 with portions removed for the purpose of illustration.
Figure 6:
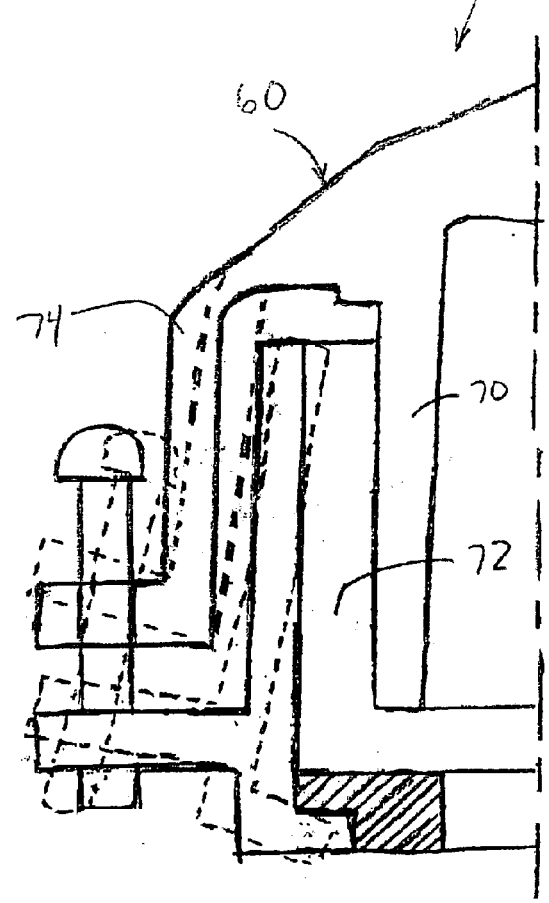
FIG. 6 is an enlarged, partial cross-sectional view of the movable member illustrated in FIGS. 3–5 with portions removed for the purpose of illustration, and with a tilted or deformed (i.e., exaggerated) position of the movable member shown in dotted lines.

Referring initially to FIGS. 1 and 2, a rear derailleur 10 in accordance with the present invention is illustrated as being coupled to a frame 12 of a bicycle (only a portion illustrated in FIG. 1). More specifically, the rear derailleur 10 is illustrated as being coupled to the rear fork of the frame 12 of the bicycle, which has a rear gear assembly having multiple rear gears or sprockets S with a chain C operatively coupling the rear sprockets S to a set of front gears or sprockets (not shown) in a conventional manner for transmitting the desired rotational torque to the rear wheel of the bicycle. The rear derailleur 10 includes an adjustment mechanism 13, which can adjust a position of a chain guide in an axial direction. The rear derailleur 10 is similar to the rear derailleur of U.S. Pat. No. 6,394,921, except that the adjustment mechanism 13 of the rear derailleur 10 of the present invention is designed to further reduce play between the various parts, as explained in more detail below. The adjustment mechanism 13 includes various parts of the rear derailleur 10, as also explained below.

The rear derailleur 10 is coupled to a rear derailleur shifting mechanism (not shown) via a rear derailleur cable 14 in a conventional manner. More specifically, the rear derailleur 10 is illustrated as top-normal type that is designed to be normally biased outwardly such that the chain C is normally positioned on the outermost gear or sprocket S. In other words, when the rider moves the rear derailleur shifting mechanism, the cable 14 pulls the rear derailleur 10 to move chain C inwardly to engage the next gear. However, it will be apparent to those skilled in the art from this disclosure that the rear derailleur 10 could be a low-normal type that is designed to be normally biased inwardly such that the chain C is normally positioned on the innermost gear or sprocket S, if needed and/or desired.

Referring still to FIGS. 1 and 2, the rear derailleur 10 basically includes a base member 20, a movable member 22, a linkage assembly 24 and a chain guide 26. The base member 20 or the movable member 22 can have an adjustment mechanism for adjusting the position of the chain guide 26 in an axial direction with respect to the rear sprockets S of the bicycle as discussed below. While a mechanical derailleur 10 is illustrated, it will be apparent to those skilled in the art that the adjustment mechanisms can be employed in other types of derailleurs such as pneumatic derailleurs, electric derailleurs or electromechanical derailleurs.

Generally, the base member 20 is fixedly coupled to the frame 12 for limited rotational movement, while the movable member 22 is coupled to the base member 20 via the linkage assembly 24. The chain guide 26 is pivotally coupled to the movable member 22, as discussed below. The basic operation of the rear derailleur 10 is well known in the prior art. Therefore, the rear derailleur 10 will not be discussed or illustrated in detail herein. Rather, this disclosure will focus on the adjustment mechanism 13 of the movable member 22 when describing the first embodiment.

While the base member 20 is illustrated as being coupled directly to the frame 12, it will be apparent to those skilled in the art from this disclosure that a removable derailleur hanger or hanging plate (not shown) may be utilized to connect the base member 20 of the rear derailleur 10 to the frame 12. These types of derailleur hangers (not shown) are well known in the art, and thus, will not be discussed or illustrated herein.

As seen in FIGS. 1 and 2, the base member 20 includes a housing 30 rotatably supported on a first horizontal shaft or axle 32 in a conventional manner. The base member 20 further includes a fixed element (stopper plate) 34 that is secured to the first axle 32 and to the frame 12 in a conventional manner. A first coil spring or biasing member 36 is coaxially mounted about the axle 32. The first spring 36 has a first end 36a coupled to the housing 30, a second end 36b coupled to the stopper plate 34 and a coiled portion 36c coaxially arranged about the first axle 32.

The first axle 32 is a bolt that is threadedly coupled to the frame 12 of the bicycle such that the first axle 32 forms a pivot axis. The base member 20 is relatively conventional and can be further understood by U.S. Pat. No. 4,690,663. Basically, the first spring 36 is preferably a conventional coil spring with the first end 36a secured within an axially oriented bore of housing 30, and the second free end 36b received in an axially oriented hole of the stop plate 34. The first coil spring 36 is sized to be positioned about the shaft or axle 32. The housing 30 of the base member 20 is rotatably supported to the first horizontal axle 32. The housing 30 has an attachment portion for swingably supporting the linkage assembly 24 and the movable member 22 about first axle 32.

The linkage assembly 24 includes a pair of links 40a and 40b that are pivotally coupled at first ends to the housing 30 of the base member 20 and pivotally coupled at their other ends to the movable member 22. Specifically, four pins 43 are used to pivotally couple links 40a and 40b to the base member 20 and the movable member 22. A coil spring (not shown) is coupled between the links 40a and 40b for biasing the chain guide 26 axially outwardly in this embodiment.

The outer link 40a is provided with a cable-fixing bolt 41 for attaching the free end of the inner wire of the shift cable 14 thereto. Accordingly, when the rider operates the rear derailleur shifting mechanism (not shown) to pull the inner wire of the shift cable 14, this will cause the links 40a and 40b to pivot inwardly against the bias of the coil spring (not shown) and will cause the movable member 22 and the chain guide 26 to move inwardly towards the center of the bicycle. This in turn will cause the chain C to move from an outer gear to the next inner gear. Of course, if the rear derailleur shifting mechanism is moved to release the inner wire of the shift cable 14, the spring (not shown) will move the links 40a and 40b such that the chain guide 26 will move the chain C outwardly from a larger gear to a smaller gear.

Referring to FIGS. 1–4, the chain guide 26 basically has a pair of guide plates 46a and 46b with a guide sprocket or pulley 48 rotatably coupled between the guide plates 46a and 46b and a tension sprocket or pulley 50 rotatably coupled between the guide plates 46a and 46b. The guide sprocket 48 and the tension sprocket 50 engage the chain C in a conventional manner. Accordingly, the additional parts of the chain guide 26 will not be discussed or illustrated in detail herein. The pulleys 48 and 50 engage with the driving chain C in an inverse-S-like manner, thereby guiding the chain C to a desired sprocket S of the multistage sprocket assembly.

The chain guide 26 is movably supported on the movable member 22 by a second horizontal shaft or axle 52. Specifically, one end of the horizontal shaft or axle 52 is fixedly coupled within a hole in the guide plate 46b. The chain guide 26 can move axially along the axis of the second axle 52 as well as pivot about the axis of the second axle 52. In the illustrated embodiment, the horizontal shaft or axle 52 is riveted to the guide plate 46b. Thus, the chain guide 26 prefereably does not move relative to the second axle 52. Of course, it will be apparent to those skilled in the art from this disclosure that the axle 52 could be attached to the guide plate 46b in other ways if needed and/or desired.

The movable member 22 is pivotally mounted on the horizontal axle 52, which is substantially parallel to the first horizontal axle 32. Preferably, the horizontal axle 52 is provided with an annular groove 52a in its center for receiving a lubricant or grease so that the movable member 22 can smoothly pivot and/or slide on the axle 52. The movable member 22 has an attachment portion that is pivotally coupled to the links 40a and 40b via a pair of the pivot pins 43.

The movable member 22 basically includes the adjustment mechanism 13, which basically includes a housing 60 of the movable member 22, an adjustment member or device 62, a fixed element 64 and a second spring 66. The housing 60 is pivotally coupled to the linkage assembly 24, while the fixed element 64 is fixedly secured to the guide plate 46b via the second axle 52. Basically, parts of the housing 60, the second axle 52, the adjustment member or device 62, the fixed element 64 and the chain guide 26 preferably form the parts of the adjustment mechanism 13 of the movable member 22, which selectively adjusts the axial position of the chain guide 26 relative to the movable member 22.

The adjustment member or device 62 is coupled between the housing 60 and the fixed element 64 so that the chain guide 26 can be moved in an axial direction along the axis of the second axle 52 to change the axial position of the chain guide 26. The adjustment member or device 62 will be discussed in further detail below.

Referring to FIGS. 3–14, the housing 60 preferably includes an inner tubular guide portion 70, a tubular recess 72 formed around the inner tubular guide portion 70 and an outer tubular guide portion 74 formed around the tubular recess 72. The housing 60 is preferably constructed of a strong, rigid, non-compressible material such as a metallic material or a hard plastic material. Moreover, the parts of the housing 60 are preferably integrally formed together as a one-piece, unitary member by molding, casting or any suitable manufacturing technique.

The outer tubular guide portion 74 of the housing 60 forms an internal cavity of the housing 60, which receives part of the fixed element 64 therein. The cavity of the housing 60 preferably has the inner tubular guide portion 70 centrally located therein such that the tubular recess 72 is located radially between the inner tubular guide portion 70 and the outer tubular guide portion 74. Parts of the fixed element 64 are preferably at least partially received in the tubular recess 72.

The inner tubular guide portion 70 is preferably a cylindrical member that forms a cylindrical blind bore for pivotally and slidably receiving a first end of the second axle 52 therein. The tubular recess 72 is a substantially cylindrical shaped annular recess formed around the inner tubular guide portion 70 for slidably receiving part of the fixed element 64 therein.

The outer tubular portion 74 includes a substantially cylindrical shaped (concave) inner surface 76 with a pair of rigid support projections 78 extending therefrom. The support projections 78 are designed to selectively contact part of the fixed element 64, as discussed below in more detail. Preferably, the inner surface 76 has a very slight conical shape (e.g., about one degree) that is so slight that the angle/tilt of the inner surface 76 may not be readily visible to the naked eye. Similarly, the inner tubular guide portion 70 also has very slight conical shape (e.g., about one degree) that is so slight that the angle/tilt may not be readily visible to the naked eye.

The support projections 78 are preferably constructed of a strong, rigid, non-compressible material such as a metallic material or a hard plastic material. Moreover, the support projections 78 are preferably integrally formed with the outer tubular guide portion 74 as a one-piece, unitary member. However, it will be apparent to those skilled in the art from this disclosure that the fixed element 64 could include support projections rather than the outer tubular guide portion 74, as discussed below in reference to other preferred embodiments of the present invention. In any case, at least one of the fixed member 64 and the outer tubular guide portion 74 preferably includes at least one support projection arranged to selectively contact the other of the fixed member 64 and the outer tubular guide portion 74.

The support projections 78 are preferably elongated members, i.e., ridges or bump-shaped members that extend in a direction parallel to each other and parallel to the center axis of the axle 52. The support projections 78 preferably extend along the length of the outer tubular portion 74 such that the inner surface 76 has a C-shape as viewed in cross-section along the axis of the axle 52. More specifically, each of the support projections 78 includes an elongated convex contact surface 78a that forms the ridge or bump-shape. The circumferential orientation and the interaction of the support projections 78 with the fixed element 64 will be discussed in more detail below.

Referring to FIGS. 3–7 and 16–27, the fixed element 64 basically includes a fixed tubular guide portion 80, a first bushing 82 mounted at one end of the fixed tubular guide portion 80 and a second bushing 84 mounted at the other end of the fixed tubular guide portion 80. The fixed element 64 is secured to the guide plate 46b via the second axle 52. Specifically, the second end of the second axle 52 has a reduced diameter section so that an abutment shoulder is formed for holding the second bushing 84 of the fixed member 64 against the guide plate 46b.

The fixed tubular guide portion 80 is designed to rotate about the second axle 52. Moreover, the fixed tubular guide portion 80 is non-rotatably coupled to the housing 60 via the adjustment member 62 so that they rotate together about the second horizontal axle 52. The fixed tubular guide portion 80 has an inwardly extending annular flange 86 that engages the second bushing 84. The flange 86 and the bushing 84 cooperate to rotatably secure the fixed tubular guide portion 80 around the axle 52.

As best seen in FIGS. 4 and 19–22, the fixed tubular guide portion 80 basically includes a convex outer surface 80a, an annular recess 80b, a first axially extending recess 80c and a second axially extending recess 80d. The convex outer surface 80a is designed to selectively contact the support projections 78, as discussed below. The annular recess 80b is designed to receive the C-shaped snap ring 88 to secure the first bushing 82 to the fixed tubular guide portion 80, as also discussed below. The axially extending recesses 80c and 80d are designed to receive part of the bushing 82 to non-rotatably couple the bushing 82 to the fixed tubular guide portion 80.

The fixed tubular guide portion 80 can be considered a first tubular guide portion, while the outer tubular guide portion 74 can be considered a second (larger) tubular guide portion with a larger radial width or circumference than the fixed tubular guide portion 80. The (first) fixed tubular guide portion has a radial width larger than a radial width of the inner tubular guide portion 70 of the housing 60 such that the second spring 66 is arranged between an inner surface of the fixed tubular guide portion 80 and an outer surface of the inner tubular guide portion 70.

Figure 7:
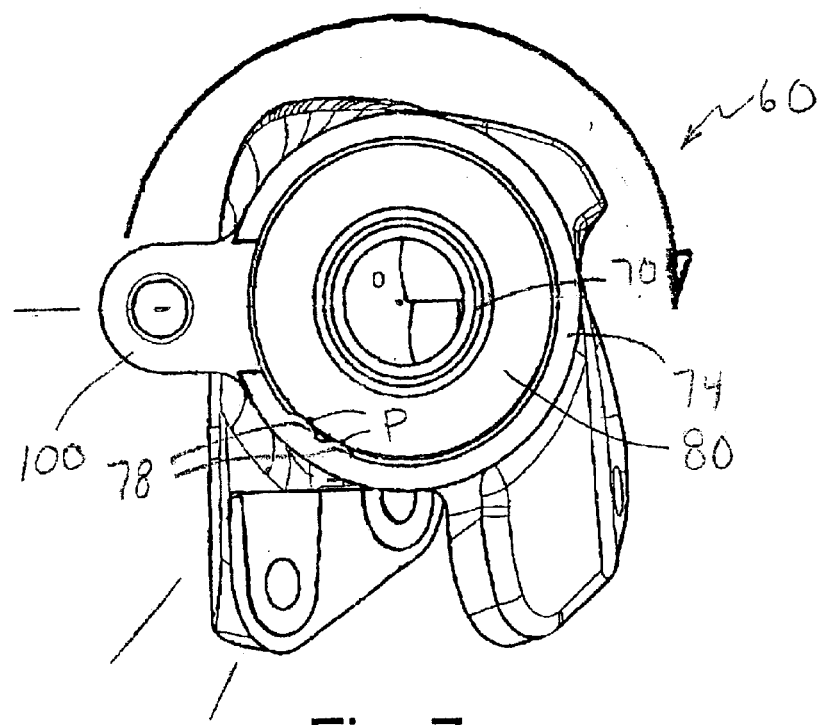
FIG. 7 is an inside end elevational view of the movable member illustrated in FIGS. 3–6 with portions removed for the purpose of illustration.

The outer surface 80a of the fixed tubular guide portion 80 is designed to selectively contact the support projections 78 to form a pair of linear contact points P (FIG. 7). In particular, the outer surface 80a has a diameter (i.e., outer width) smaller than a diameter (i.e., inner width) of the inner surface 76 to form a gap less than about 0.65 millimeters therebetween. However, the projections 78 effectively reduce this gap at their location such that the support projections 78 selectively contact the outer surface 80a when the fixed tubular guide portion 80 and/or the outer tubular guide portion 74 move relative to each other. In other words, a minimal gap is preferably formed between the support projections 78 and the outer surface 80a such that the support projections 78 selectively contact the outer surface 80a when the outer tubular portion 74 and the fixed tubular guide portion 80 move relative to each other from non-contacting positions to contacting positions.

More specifically, during use of the rear derailleur 10, the various members are subjected to forces or stresses such that the outer tubular guide portion 74 and/or the fixed tubular guide portion 80 may tilt and/or deform slightly. This tilting or deformation causes the support projections 78 to contact the outer surface 80a of the fixed tubular guide portion 80 to limit this movement and/or deformation. In other words, the support projections 78 limit the allowable relative movement between the outer tubular portion 74 and the fixed tubular portion 80. Of course, it will be apparent to those skilled in the art from this disclosure that the support projections 78 could be formed on the fixed tubular portion 80 rather than the outer tubular portion 74 if needed and/or desired, as discussed below with reference to another preferred embodiment of the present invention.

Figure 8:
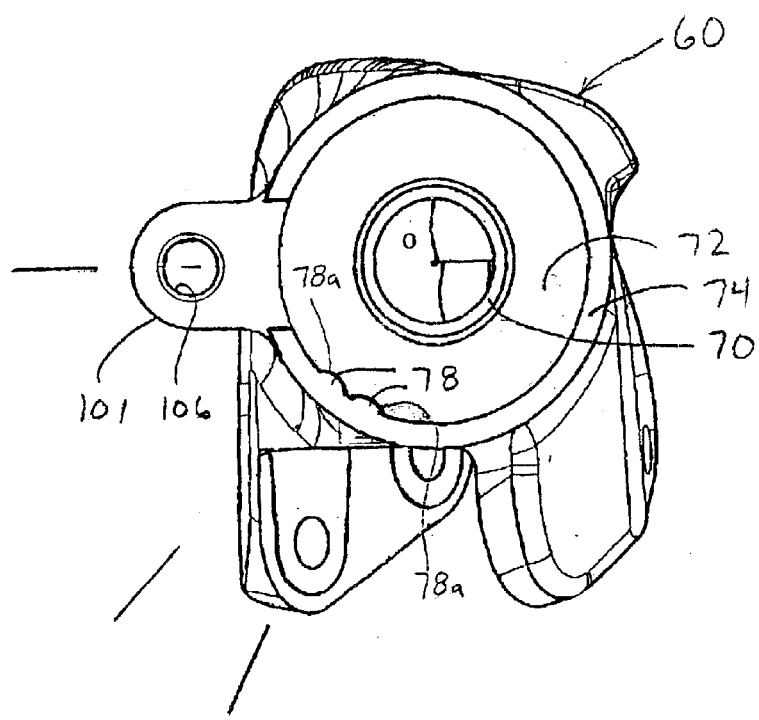
FIG. 8 is an inside end elevational view of a housing of the movable member illustrated in FIGS. 3–6.
Figure 9:
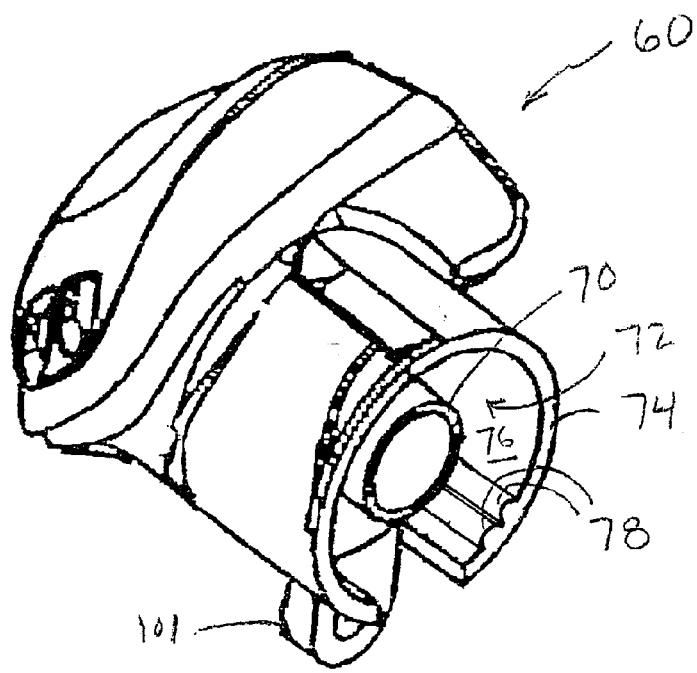
FIG. 9 is an enlarged perspective view of the housing illustrated in FIGS. 3–8.
Figure 10:
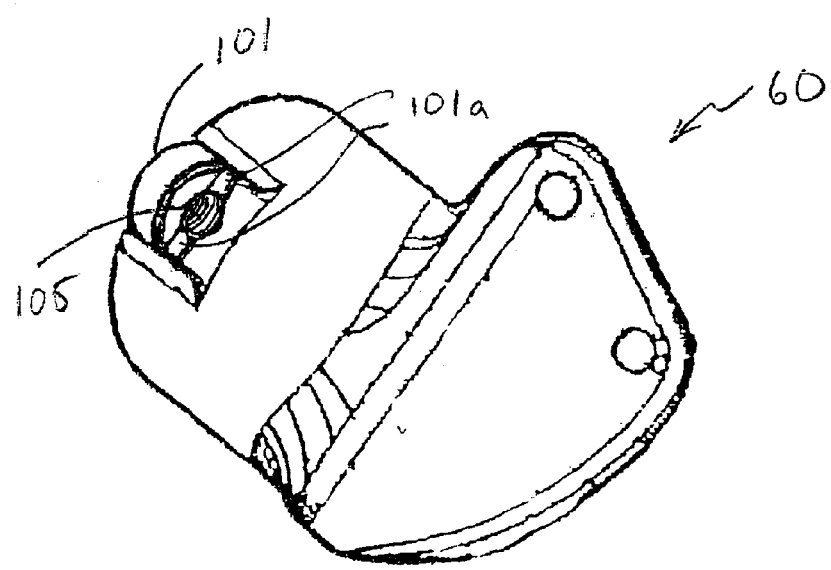
FIG. 10 is a reverse perspective view of the housing illustrated in FIGS. 3–8.
Figures 11, 12:
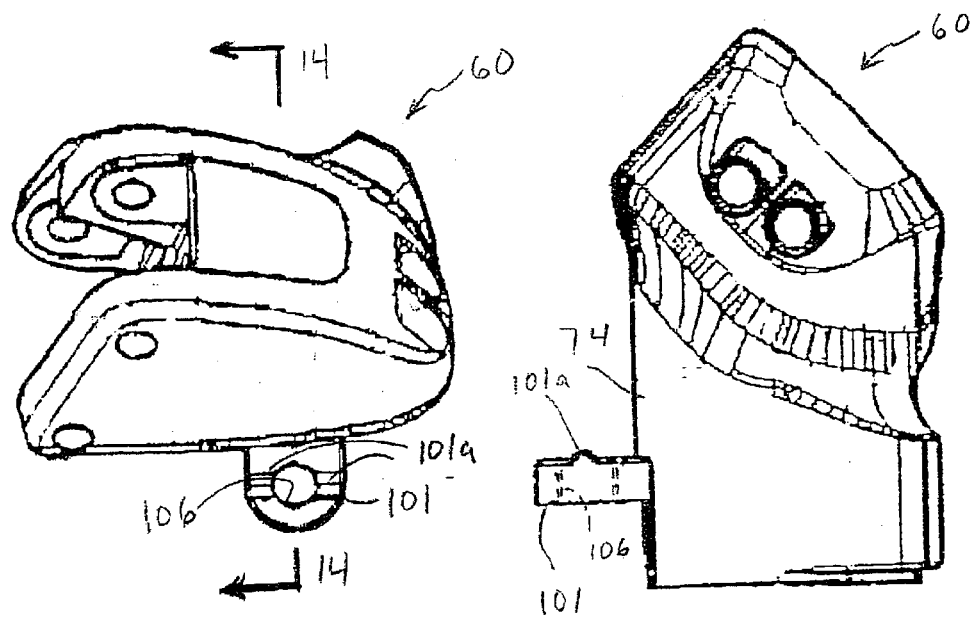
FIG. 11 is an outside elevational view of the housing illustrated in FIGS. 3–10.
FIG. 12 is a front side elevational view of the housing illustrated in FIG. 11.
Figures 13, 14:
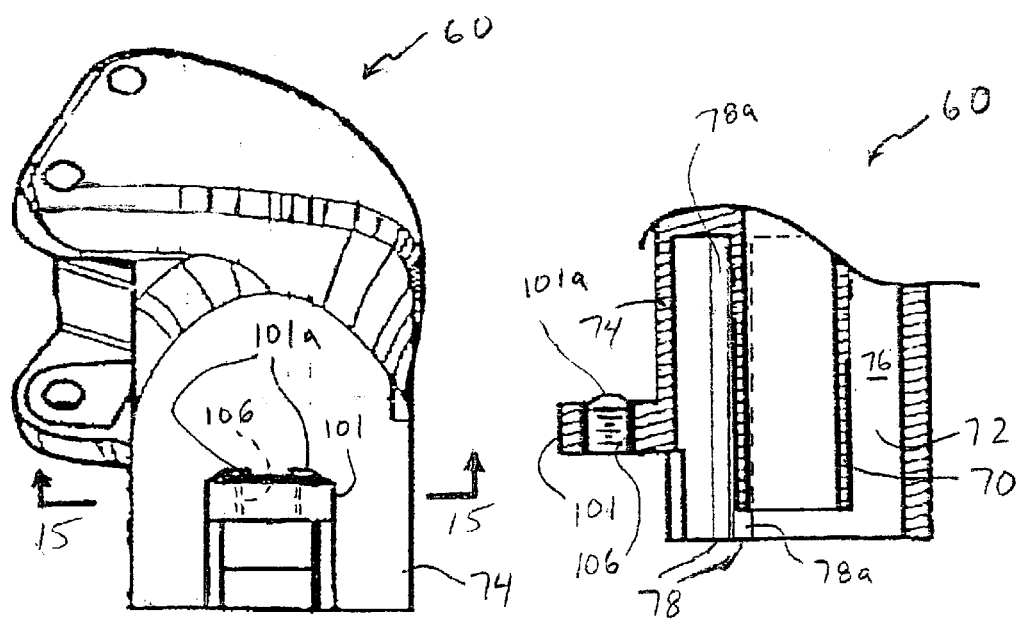
FIG. 13 is a bottom side elevational view of the housing illustrated in FIGS. 11 and 12.
FIG. 14 is a partial cross-sectional view of the housing illustrated in FIGS. 11–13, as viewed along section line 14—14 of FIG. 11.
Figure 15:
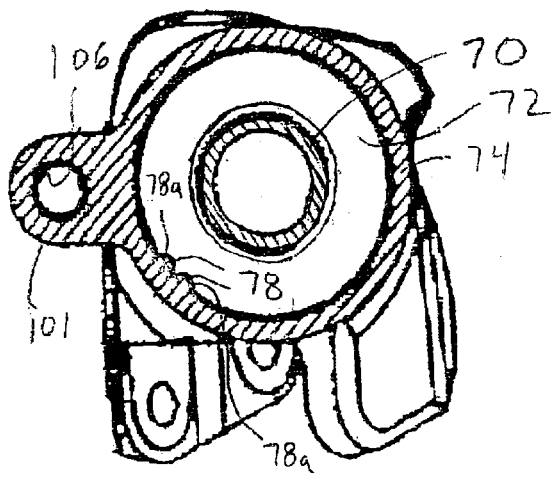
FIG. 15 is a cross-sectional view of the housing illustrated in FIGS. 11–14, as viewed along section line 15—15 of FIG. 13.
Figure 16:
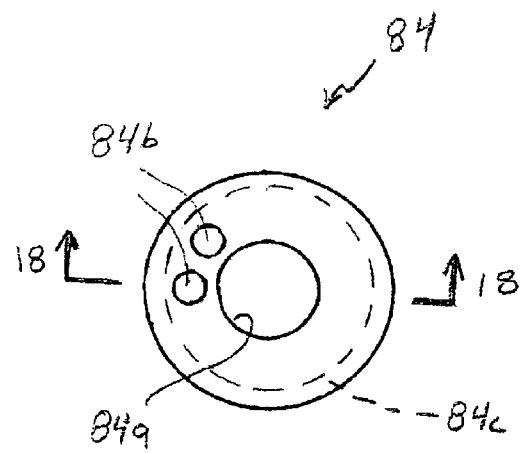
FIG. 16 is an outside elevational view of an inner bushing of the movable member illustrated in FIGS. 3 and 4.
Figure 17:
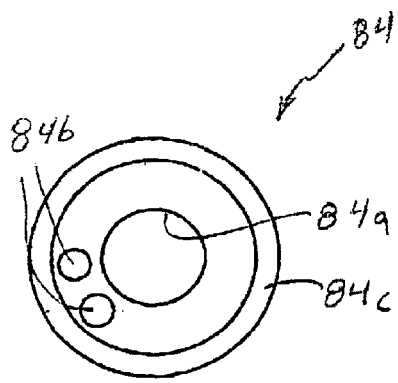
FIG. 17 is an inside elevational view of the inner bushing illustrated in FIG. 16.
Figure 18:
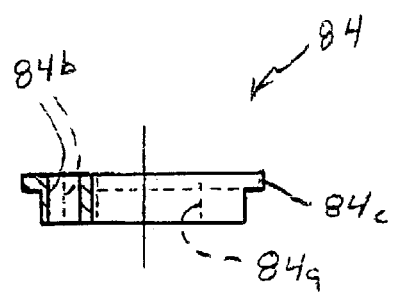
FIG. 18 is a partial cross-sectional view of the inner bushing illustrated in FIGS. 16 and 17, as viewed along section line 18—18 of FIG. 16.
Figures 19, 20:
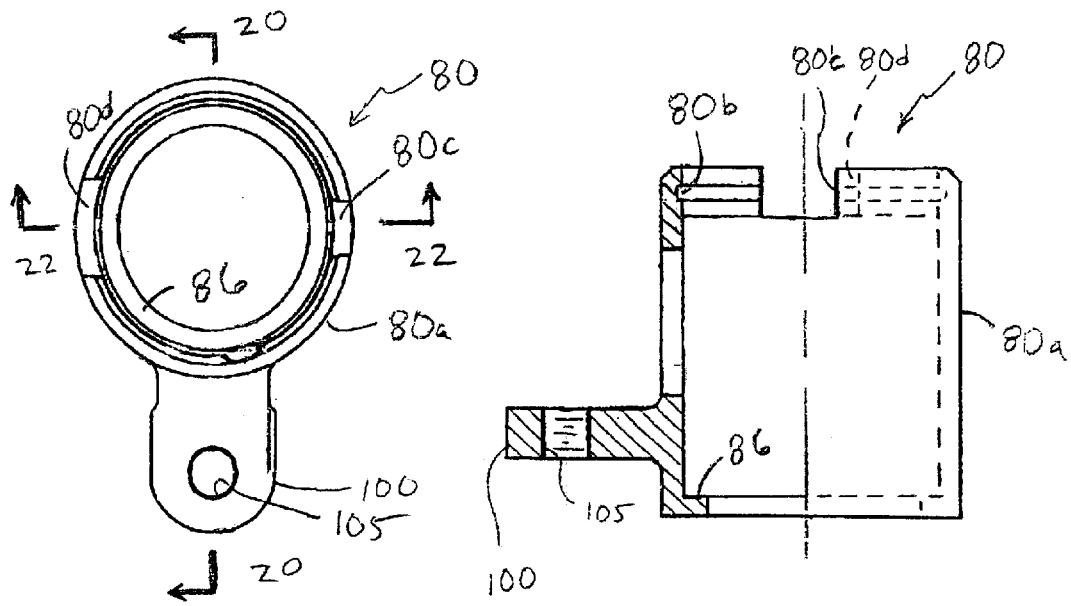
FIG. 19 is an outside elevational view of a fixed tubular guide portion of the movable member illustrated in FIGS. 3 and 4.
FIG. 20 is a partial cross-sectional view of the fixed tubular guide portion illustrated in FIG. 19, as viewed along section line 20—20 of FIG. 19.
Figures 21, 22:
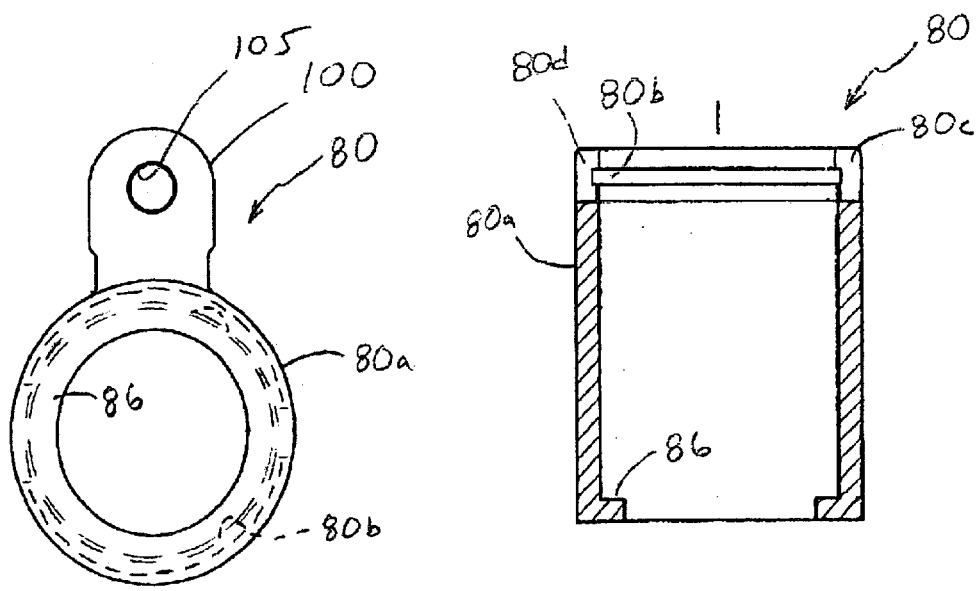
FIG. 21 is an inside elevational view of the fixed tubular guide portion illustrated in FIGS. 19 and 20.
FIG. 22 is a cross-sectional view of the fixed tubular guide portion illustrated in FIGS. 19–21, as viewed along section line 22—22 of FIG. 19.
Figure 23:
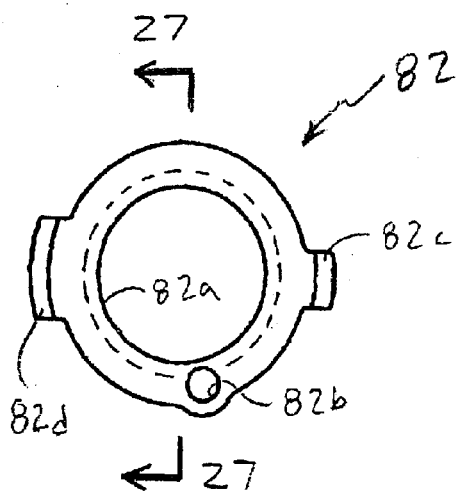
FIG. 23 is an outside elevational view of an outer bushing of the movable member illustrated in FIGS. 3 and 4.
Figure 24:
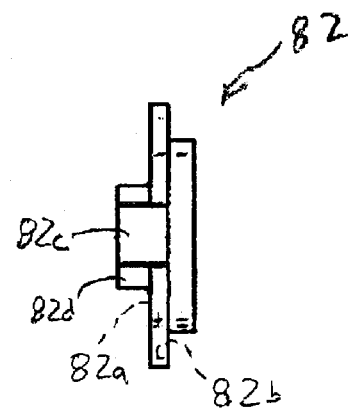
FIG. 24 is a right side elevational view of the outer bushing illustrated in FIG. 23.
Figure 25:
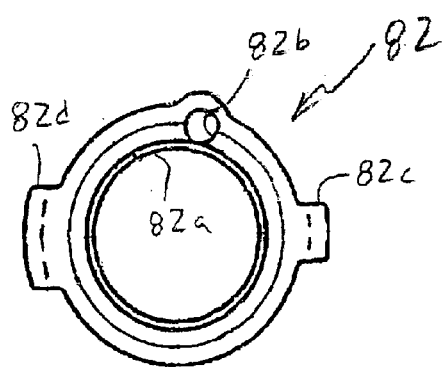
FIG. 25 is an inside elevational view of the outer bushing illustrated in FIGS. 23 and 24.
Figure 26:
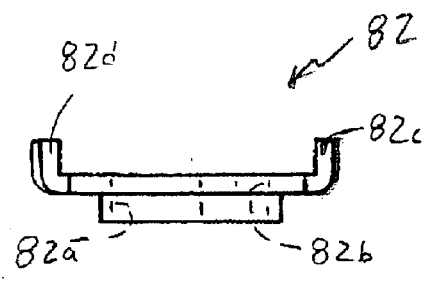
FIG. 26 is a front elevational view of the outer bushing illustrated in FIGS. 23–25.
Figure 27:
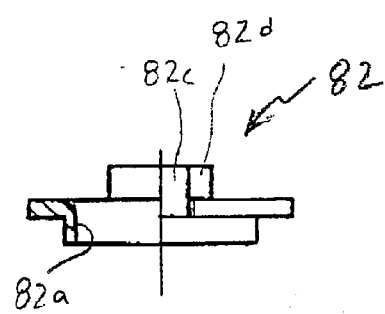
FIG. 27 is a partial cross-sectional view of the outer bushing illustrated in FIGS. 23–26, as viewed along section line 27—27 of FIG. 23.

Due to the arrangement of the support projections 78 in this embodiment, the linear contact points P of the support projections 78 are preferably parallel to each other. However, because the support projections 78 contact the outer surface 80a during deformation and/or tilting, the linear contact points are not necessarily always parallel to the center axis of the second axle 52. Additionally, the linear contact points P are preferably circumferentially spaced less than about twenty-five (25) degrees apart from each other, as seen in FIGS. 7 and 8. In the illustrated embodiment, the linear contact points P are preferably circumferentially spaced about seventeen (17) degrees apart from each other. Moreover, each of the linear contact points P of the support projections 78 is preferably circumferentially spaced from the adjustment member 62 around the housing 60. More specifically, the support projections 78 are located between about forty (40) degrees and about seventy (70) degrees from a radial line extending between the center axis of the second axle 52 and a center axis of the adjustment member 62 as measured in the counter-clockwise direction about the center axis of the second axle 52 when viewed from the bottom (inside), as seen in FIGS. 7 and 8. In the illustrated embodiment, the linear contact points P of the support projections 78 are preferably circumferentially spaced from the adjustment member 62 about forty-seven (47) degrees and about sixty-four (64) degrees, respectively, in the counter-clockwise direction from the radial line extending between the center axes of the second axle 52 and the adjustment member 62.

As best seen in FIGS. 4 and 23–27, the first bushing 82 is a stepped, annular ring-shaped member that is fixedly coupled to a first or free end of the fixed tubular guide portion 80 via the C-shaped snap ring 88. The first bushing 82 includes a center bore 82a, an axially extending hole 82b, a first axially extending flange 82c and a second axially extending flange 82d. The center bore 82a slidably receives the inner tubular guide portion 70. The axially extending hole 82b receives a first end 66a of the second spring 66. The first and second axially extending flanges 82c and 82d are received in the first and second axially extending recesses 80c and 80d, respectively of the fixed tubular guide portion 80.

Due to the above arrangement, the first bushing 82 is fixedly, non-rotatably secured to the fixed tubular guide portion 80 via the snap ring 88, the recesses 80c and 80d, and the flanges 82c and 82d. Accordingly, the first end 66a of the second spring 66 applies a rotational biasing force on the fixed tubular guide portion 80 and the housing 60, which is non-rotatably coupled to the fixed tubular guide portion 80.

The second axially extending flange 82d is preferably larger than the first axially extending flange 82c. Similarly, the second axially extending recess 80d is preferably larger than the first axially extending recess 80c. Thus, the axially extending hole 82b is circumferentially arranged in a particular orientation so that the second spring 66 applies the proper biasing force on the fixed tubular guide portion 80 and the housing 60. The snap ring 88 secures the first bushing 82 from moving axially away from the chain guide 26 to secure the fixed element 64 against axially movement away from the chain guide 26.

As best seen in FIGS. 4 and 16–18, the second bushing 84 is a ring-shaped member with a center bore 84a, a pair of axially extending holes 84b and an annular flange 84c. The center bore 84a has part of the second axle 52 received therein. One of the holes 84b receives a second end 66b of the second spring 66, while the other hole 84b receives a pin 90 that extends from the guide plate 46b. The pin 90 prevents rotation of the second bushing 84 relative to the guide plate 46b around the second axle 52. The second bushing 84 is a step-shaped member to form the annular flange 84c. The annular flange 84c is sized to overlap with the annular flange 86 of the fixed tubular guide portion 80. Accordingly, the fixed tubular guide portion 80 is rotatably secured around the second bushing 84 and the chain guide 26. Moreover, the chain guide 26 and the fixed tubular guide portion 80 are biased relative to each other about the axis of the second axle 52 via the second spring 66. Thus, the housing 60 and the chain guide 26 are also biased relative to each other about the axis of the second axle 52 via the second spring 66. Optionally, a washer (not shown) can be arranged between the annular flange 84c of the second bushing 84 and the annular flange 86 of the fixed tubular guide portion 80, if needed and/or desired.

The adjusting member or device 62 of the movable member 22 basically includes a first tab member 100 coupled to the fixed tubular guide portion 80, a second tab member 101 coupled to the housing 60 and an adjusting screw 103 with an anti-loosening mechanism 104. The first and second tab members 100 and 101 extend outwardly from the walls of the fixed tubular guide portion 80 and the housing 60, respectively. The first and second tab members 100 and 101 have threaded bores 105 and 106, respectively, for threadedly receiving the adjusting screw 103. The adjusting screw 103 is inserted into the tab members 100 and 101. The adjusting screw 103 adjusts the axial position of the fixed tubular guide portion 80 with respect to the housing 60.

Specifically, the adjusting screw 103 has a head portion 110 and a shaft portion 111. The head portion 110 has a tool receiving recess 110a for receiving a tool to rotate the screw 103. The shaft portion 111 has a first set of left hand threads 111a and a second set of right hand threads 111b. Accordingly, the threaded bores 105 and 106 of the tab members 100 and 101 have different spiral directions relative to each other. Thus, the first set of threads 111a of the adjusting screw 103 and the threaded bore 105 are spiraled in a different direction from the second set of threads 111b of the adjusting screw 103 and the threaded bore 106. In other words, the threaded bores 105 and 106 have corresponding left hand threads and right hand threads, respectively. Rotation of the adjusting screw 103 causes axial movement of the fixed tubular guide portion 80 away from or toward the housing 60.

The anti-loosening mechanism 104 is installed around shaft portion 111 of adjusting screw 103. The anti-loosening mechanism 104 basically includes a snap-ring 114 that is received in an annular groove 115 on the shaft portion 111 of the adjusting screw 103, a coil spring 116 and a retaining washer 117 that is non-rotatably secured to the shaft portion 111 of the adjusting screw 103. The spring 116 is designed to hold the retaining washer 117 against tab member 100 and also places the threads 111a and 111b of the screw 103 in axial compression with the threads of the bores 105 and 106.

The retaining washer 117 has a non-circular hole 118 with a pair of oppositely spaced-apart flat surfaces 119 that engage a pair of flat surfaces 111c of the shaft portion of the adjusting screw 103. Accordingly, the retaining washer 117 is non-rotatably coupled to the adjusting screw 103, but axially slidable on the shaft portion 111 of the adjusting screw 103. The retaining washer 117 also preferably includes at least two recesses 120 that engage at least two protrusions 101a formed on the second tab member 101. These recesses 120 and protrusions 101a cooperate to prevent rotational movement of the adjusting screw 103. Thus, the adjusting screw 103 is prevented from being accidentally disengaged from the tab members 100 and 101.

Assembly of the adjustment mechanism 13 is easily attained by the arrangement of the present invention. The adjustment mechanism 13 basically includes the fixed element 64, the adjustment member or device 62, the housing 60 and the spring 66. First, the fixed element 64 is assembled. The second bushing 84 is first inserted into the fixed tubular guide portion 80 so that the flange 84c of the second bushing 84 rests on the annular flange 86 of the fixed tubular guide portion 80. Next, the spring 66 is inserted into the fixed tubular guide portion 80 so that the second end 66b of the spring 66 engages one of the bores 84b in the second bushing 84. The first bushing 82 can now be inserted into the end of the fixed tubular guide portion 80 so that the first end 66a of the spring 66 is engaged in the hole 82b of the first bushing 82. The first bushing 82 can now be secured to the fixed tubular guide portion 80 via the snap ring 88.

The fixed element 64 can now be fastened to the guide plate 46b by first axle 52, which is riveted to the chain guide plate 46b. It is important when installing the fixed element 64 to the guide plate 46b that the pin 90 is inserted in one of the holes 84b of the second bushing 84 (i.e., the hole 84b that does not have the second end 66b of the spring 66 received therein).

Next, the adjusting screw 103 is initially threaded into the second tab member 101 of the housing 60 with the spring 116 and the retaining washer 117 thereon. The housing 60 is now installed on the fixed element 64 and the second axle 52 so that the inner tubular guide portion 70 closely engages the second axle 52. In particular, the inner tubular guide portion 70 is aligned with the second axle 52 and inserted thereon. Moreover, the first bushing 82 engages the outer surface of the inner tubular guide portion 70. Accordingly, the fixed tubular guide portion 80 is now coaxially mounted around the inner tubular guide portion 70 with the first bushing 82 providing for smooth sliding therebetween.

Next, the free end of the adjusting screw 103 contacts the threaded bore 105 of the first tab member 100. The adjusting screw 103 is now rotated such that the second set of threads 111b and the threaded bore 106 move the adjusting screw 103 in an axial direction out of the second tab member 101 (i.e., away from the chain guide 26), while the first set of threads 111a simultaneously are threaded into the threaded bore 105 of the first tab member 100. Once the screw 103 is sufficiently engaged in the threaded bore 105 of the first tab member 100, the spring 116 can now be compressed and the snap-ring 114 inserted into the groove 115 of the adjusting screw 103. This now applies an axial force on the retaining washer 117, which prevents accidental rotation of the adjusting screw 103. Now the screw 103 can be further loosened for shipment.

Second Embodiment

Figure 28:
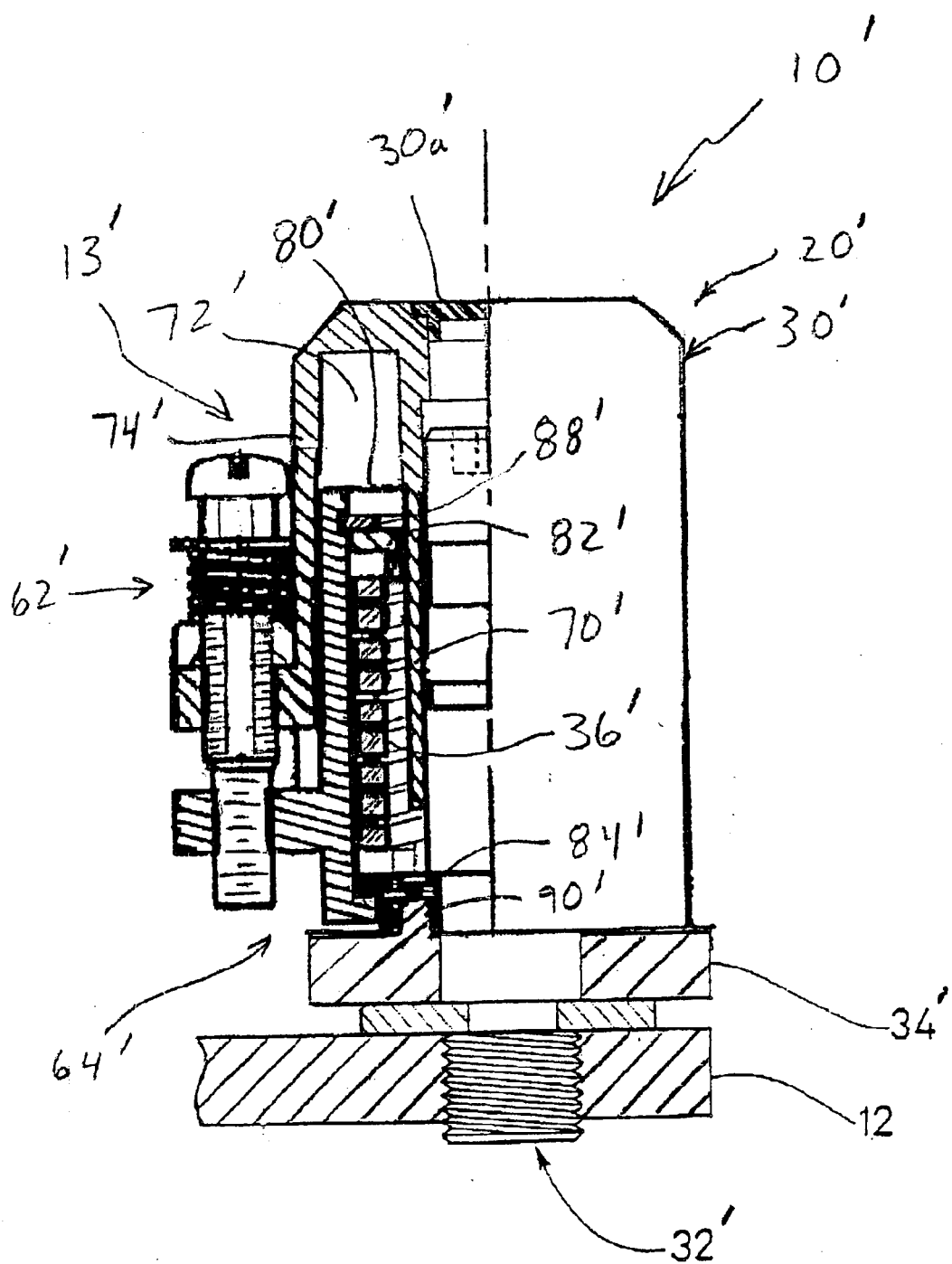
FIG. 28 is a partial cross sectional view of a modified base member in accordance with another embodiment of the present invention with certain portions broken away for the purposes of illustration.
Figure 29:
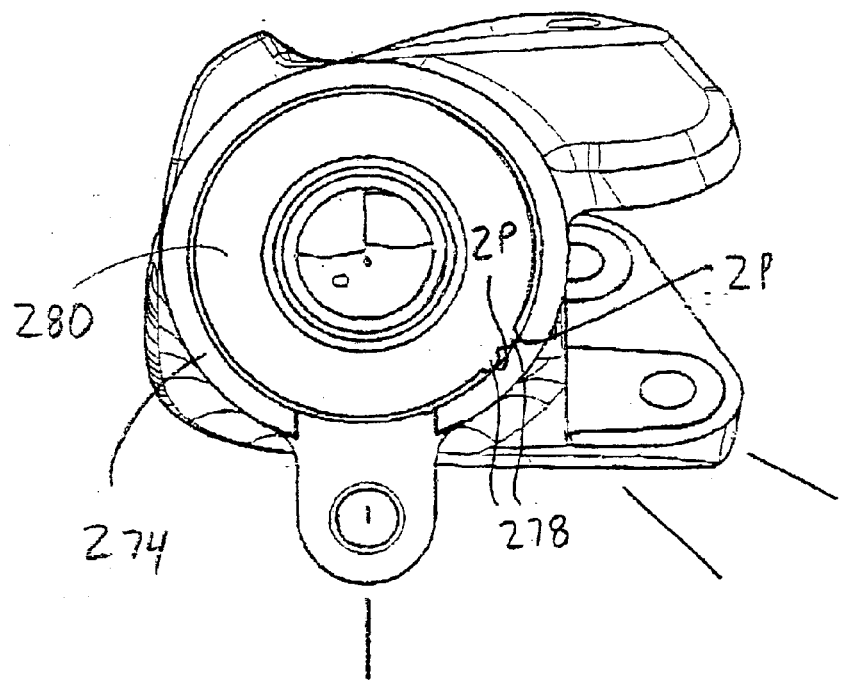
FIG. 29 is a partial, inside elevational view of a modified movable member in accordance with the present invention.
Figure 30:
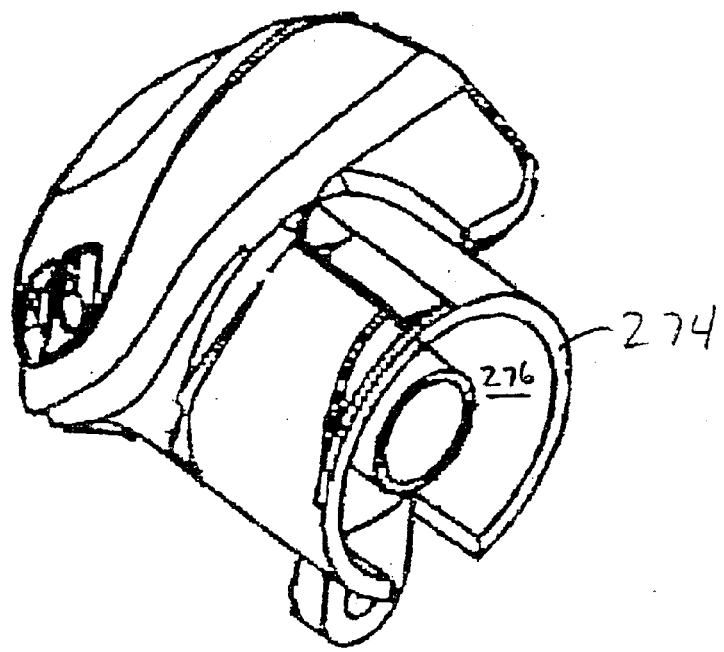
FIG. 30 is an enlarged perspective view of the housing of the modified movable member illustrated in FIG. 29.
Figure 31:
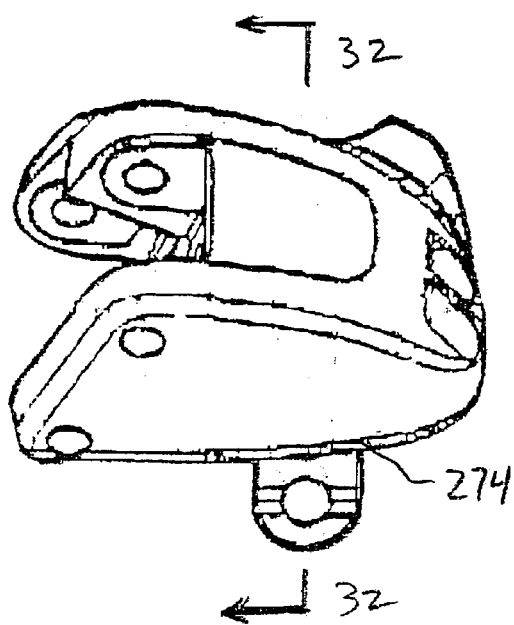
FIG. 31 is an outside elevational view of the modified housing illustrated in FIGS. 29 and 30.
Figure 32:
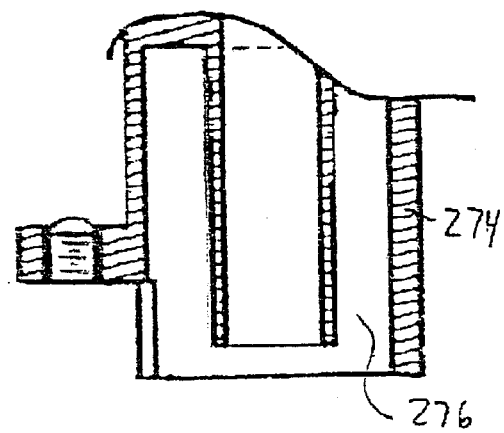
FIG. 32 is a partial cross-sectional view of the modified housing illustrated in FIGS. 29–31, as viewed along section line 32—32 of FIG. 31.
Figure 33:
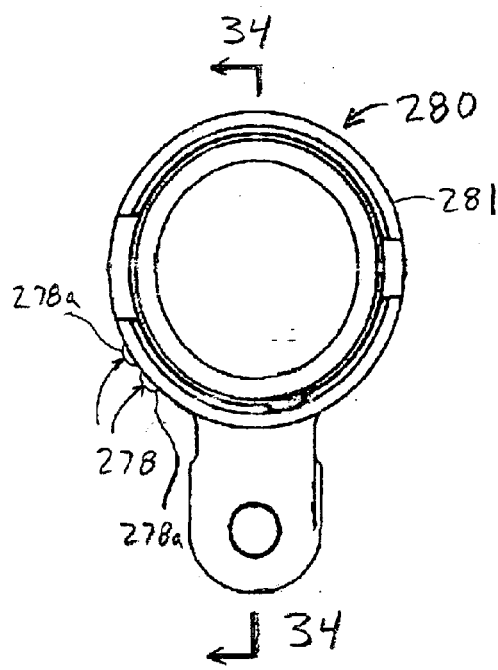
FIG. 33 is an outside elevational view of a modified fixed tubular guide portion of the modified movable member illustrated in FIG. 29.
Figure 34:
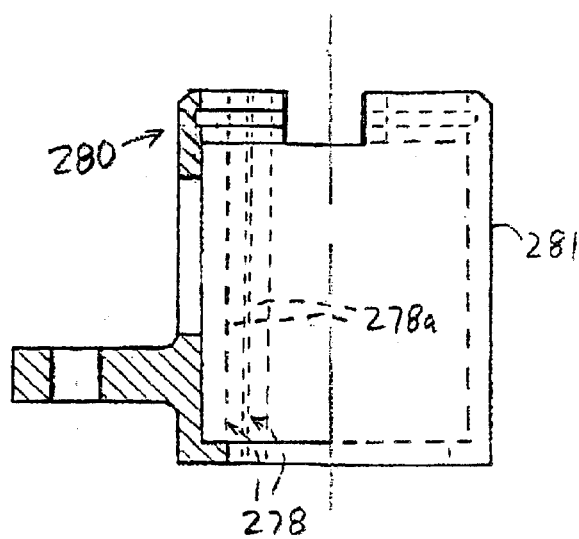
FIG. 34 is a partial cross-sectional view of the modified fixed tubular guide portion illustrated in FIG. 33, as viewed along section line 34—34 of FIG. 33.

Referring now to FIG. 28, a portion of a derailleur 10' is illustrated in accordance with a second embodiment of the present invention. Only the base member 20' of the derailleur 10' will be illustrated, since the remainder of the derailleur 10' is conventional and can be understood by reference to the first embodiment.

The base member 20' of the derailleur 10' is provided with an adjustment mechanism 13'. The adjustment member 13' is substantially identical to the adjustment member 13 of the first embodiment, but is installed on the base member 20' instead of the movable member 22. Since the construction of the adjustment mechanism 13' of the base member 20' is substantially the same as the adjustment mechanism 13 of the movable member 22 of the first embodiment, this embodiment will not be discussed or illustrated in detail herein. Rather, the following description will focus mainly on the differences. Moreover, in view of these similarities between the two embodiments, identical or substantially identical parts of this embodiment will be identified with the same reference numerals as the first embodiment but with a prime mark ('). In other words, it will be apparent to those skilled in the art from this disclosure that many of the descriptions and/or illustrations of the various parts of the derailleur 12 of the first embodiment also apply to various parts of this second embodiment.

In this second embodiment, the first horizontal shaft or axle 32' is fixedly coupled to the bicycle frame 12. More specifically, one end of first axle 32' is threaded into a bore of the bicycle frame 12. As seen in FIG. 28, the base member 20' has a housing 30' rotatably supported on the first horizontal shaft or axle 32'. The base member 20' further includes a fixed part or stopper plate 34' with a pin 90' that is secured to the axle 32' and to the frame 12. A first coil spring or biasing member 36' is coaxially mounted about the axle 32'. The first spring 36' has a first end 36a' operatively coupled to the housing 30', a second end 36b' coupled to the fixed plate 34' and a coiled portion 36c' coaxially arranged about the axis of the axle 32'.

In this embodiment, the axle 32' is a bolt that is threadedly coupled to the frame 12 of the bicycle such that the axle 32' forms a pivot axis. The housing 30' of the base member 20' has a cap 30a' covering an opening. The opening is provided for accessing the horizontal axle 32' to rotate the axle 32' to attach it to the frame 12. The housing 30' has an attachment portion for swingably supporting the linkage assembly and the movable member about the first axle 32'.

Preferably, the horizontal axle 32' is provided with an annular groove 32a' in its center for receiving a lubricant or grease so that the base member 20' can smoothly pivot and/or slide on the axle 32'. The base member 20' has an attachment portion that is pivotally coupled to links of the linkage assembly.

The base member 20' basically includes the adjustment mechanism 13', which basically includes the housing 30' of the base member 20', an adjustment member or device 62', a fixed element 64' and a second spring 36'. The housing 30' is pivotally coupled to the linkage assembly, while the fixed element 64' is fixedly secured to the frame 12 via the axle 32'.

The adjustment member or device 62' is coupled between the housing 30' and the fixed element 64' so that the chain guide can be moved in an axial direction along the axis of the second axle 32' to change the axial position of the chain guide.

The housing 30' has a cavity, which receives the fixed element 64' therein. The cavity of the housing 30' has a centrally located inner tubular guide portion 70' that forms a blind bore for pivotally and slidably receiving a first end of the second axle 32' therein. An annular tubular recess 72' is formed around the inner tubular guide portion 70' for slidably receiving the fixed element 64' therein. An outer tubular guide portion 74' is formed around the annular tubular recess 72'. The outer tubular portion 74' is identical to the outer tubular portion 74, except that the outer shape of the outer tubular portion 74' is slightly modified because it is part of the base member 20' rather than the movable member 20. Thus, the outer tubular portion 74' has a pair of projections on its inner surface identical to the first embodiment, as explained above. In view of these similarities, the outer tubular portion 74' will not be discussed and/or illustrated in detail herein.

The fixed element 64' basically includes the stopper plate 34', a fixed tubular guide portion 80', a first bushing 82' mounted at one end of the fixed tubular guide portion 80', a second bushing 84' mounted at the other end of the fixed tubular guide portion 80' and a snap ring 88'. The stopper plate 34' is arranged on the axle 32' and is arranged between the frame 12 and the fixed tubular guide portion 80'. The second bushing 84' is coupled to the frame 12 via the stopper plate 34'.

The adjusting member or device 62' of the base member 20', the fixed tubular guide portion 80', the first bushing 82' and the second bushing 84' are basically identical to the first embodiment. Since these parts are substantially the same as the first embodiment, these parts of this embodiment will not be discussed or illustrated in detail herein.

ALTERNATE ARRANGEMENT OF SUPPORT PROJECTIONS

Referring to FIGS. 29–34, a modified fixed (first) tubular guide portion 280 and a modified outer (second) tubular guide portion 274 are illustrated in accordance with the present invention. The fixed tubular guide portion 280 and the outer tubular guide portion 274 are designed to be used in place of the fixed tubular guide portion 80 and the outer tubular guide portion 74 of the first embodiment, or in place of the fixed tubular guide portion 80' and the outer tubular guide portion 74' of the second embodiment, respectively. More specifically, the fixed tubular guide portion 280 and the outer tubular guide portion 274 are identical to the fixed tubular guide portion 80 and the outer tubular guide portion 74 of the first embodiment, or the fixed tubular guide portion 80' and the outer tubular guide portion 74' of the second embodiment, except their shapes as explained below.

The outer tubular guide portion 274 preferably includes a cylindrical, concave inner surface 276 that is absent of support projections. Otherwise, the outer tubular guide portion 274 is identical to the outer tubular guide portion 74 or the outer tubular guide portion 74'. On the other hand, the fixed tubular guide portion 280 preferably includes a pair of support projections 278 designed to selectively contact the inner surface 276 of the outer tubular guide portion 274. Except for the presence of the support projections 278, the fixed tubular guide portion 280 is identical to the fixed tubular guide portion 80 or the fixed tubular guide portion 80'. Thus, the fixed tubular guide portion 280 includes a substantially cylindrical shaped (convex) outer surface 281 with the pair of rigid support projections 278 extending therefrom. The support projections 278 are preferably integrally formed with the fixed tubular guide portion 280 as a one-piece, unitary member.

Similar to the first and second embodiments, the support projections 278 are preferably elongated members, i.e., ridges or bump-shaped members that extend in a direction parallel to each other. The support projections 278 are preferably parallel to the center axis of the corresponding axle and/or the inner surface 276. The support projections 78 preferably extend along the length of the fixed tubular portion 280 such that the outer surface 281 has a C-shape as viewed in cross-section along the axis of the corresponding axle. More specifically, each of the support projections 278 includes an elongated convex contact surface 278a with a curvature smaller than the curvature of the inner surface 276 and smaller than the curvature of the outer surface 281 to form the ridge or bump-shapes.

The circumferential orientation and the interaction of the support projections 278 with the outer tubular portion 274 are basically the same as the first and second embodiments. In other words, when the various members are subjected to forces or stresses, the outer tubular guide portion 274 and/or the fixed tubular guide portion 280 may tilt and/or deform slightly. This tilting or deformation causes the support projections 278 to contact the inner surface 276 at a pair of linear contact points 2P to limit this movement and/or deformation. In other words, the support projections 278 limit the allowable relative movement between the outer tubular portion 274 and the fixed tubular portion 280 in a manner similar to the first and second embodiments. Since the outer tubular guide portion 274 and the fixed tubular guide portion 280 function in the same way as the corresponding members of the first and second embodiments, the outer tubular guide portion 274 and the fixed tubular guide portion 280 will not be discussed and/or illustrated in further detail herein.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An adjusting mechanism for adjusting a position of a chain guide of a bicycle derailleur in an axial direction, said adjusting mechanism comprising:
   an axle having a first end and a second end with a longitudinal axis extending between said first and second ends;
   a first tubular portion pivotally coupled on said axle to rotate about said longitudinal axis;
   a housing having an attachment portion adapted to be coupled to a linkage assembly of the bicycle derailleur and a second tubular portion arranged around said first tubular portion, said second tubular portion being non-rotatably arranged relative to said first tubular portion;
   a biasing member arranged to apply an urging force on said first and second tubular portions about said axle; and
   an adjustment member operatively coupled between said housing and said first tubular portion to move said housing relative to said first tubular portion in an axial direction on said axle,
   one of said first and second tubular portions having a rigid support projection arranged to selectively contact the other of said first and second tubular portions when said first and second tubular portions move relative to each other in a direction generally perpendicular to the longitudinal axis of the axle from non-contacting positions to contacting positions, said support projection being non-compressible.

2. The adjusting mechanism according to claim 1, wherein
   said support projection is integrally formed with one of said first and second tubular portions.

3. The adjusting mechanism according to claim 1, wherein
   said one of said first and second tubular portions with said support projection includes an additional rigid support projection.

4. The adjusting mechanism according to claim 3, wherein
   each of said support projections includes a convex contact surface that selectively contacts the tubular portion that is absent of said support projections.

5. The adjusting mechanism according to claim 4, wherein
   each of said support projections is elongated to form a linear contact point that selectively contacts the tubular portion that is absent of said support projections.

6. The adjusting mechanism according to claim 5, wherein
   said linear contact points of said support projections are parallel to each other.

7. The adjusting mechanism according to claim 6, wherein
   said linear contact points of said projections are circumferentially spaced less than about twenty-five degrees apart from each other.

8. The adjusting mechanism according to claim 6, wherein
   said second tubular portion includes a concave inner surface, and
   said first tubular portion includes a convex outer surface with said support projections extending therefrom, said linear contact points of said support projections being longitudinally arranged to selectively contact said concave inner surface of said second tubular portion.

9. The adjusting mechanism according to claim 6, wherein
   said first tubular portion includes a convex outer surface, and
   said second tubular portion includes a concave inner surface with said support projections extending therefrom, said linear contact points of said support projections being longitudinally arranged to selectively contact said convex outer surface of said first tubular portion.

10. The adjusting mechanism according to claim 6, wherein
    said adjustment member includes a screw operatively coupled between a first tab of said first tubular portion and a second tab of said housing, said screw having a center axis parallel to said longitudinal axis of said axle.

11. The adjusting mechanism according to claim 10, wherein
    each of said linear contact points of said support projections is circumferentially spaced between about forty degrees and about seventy degrees from said center axis of said screw as measured about said longitudinal axis of said axle.

12. The adjusting mechanism according to claim 4, wherein
    said second tubular portion includes a concave inner surface, and
    said first tubular portion includes a convex outer surface with said support projections extending therefrom, each of said convex contact surfaces of said support projections having a smaller radius of curvature than said concave inner surface of said second tubular portion.

13. The adjusting mechanism according to claim 1, wherein
    said first tubular portion includes said support projection.

14. The adjusting mechanism according to claim 1, wherein
    said second tubular portion includes said support projection.

15. The adjusting mechanism according to claim 1, wherein
    said housing includes an inner tubular guide portion arranged on said axle, said inner tubular guide portion having a radial width smaller than a radial width of said first tubular portion.

16. A derailleur for a bicycle, comprising:
    a base member adapted to be coupled to a part of the bicycle, said base member being pivotally supported on a first axle with a base element;
    a movable member adapted to shift a chain of the bicycle in a transverse direction, said movable member being pivotally supported on a second axle coupled to a plate element of a chain guide; and
    a linkage assembly movably coupled between said base member and said movable member to move said chain guide between a retracted position and an extended position, one of said base and movable members having an adjusting mechanism that movably supports said one of said members in an axial direction relative to a corresponding one of said elements on a corresponding one of said axles, said adjusting mechanism including
a first tubular portion extending from said corresponding one of said elements, said first tubular portion being pivotally coupled on said corresponding one of said axles,
a second tubular portion extending from said one of said members, said second tubular portion being arranged around said first tubular portion and being non-rotatably arranged relative to said first tubular portion, said second tubular portion being fixed to move axially with said one of said members,
a biasing member coupled between said one of said members and said corresponding one of said elements to apply an urging force between said one of said members and said corresponding one of said elements about said corresponding one of said axles, and
an adjustment member operatively coupled between said first and second tubular portions to move said one of said members relative to said first tubular portion in an axial direction on said corresponding one of said axles,
one of said first and second tubular portions having a rigid support projection arranged to selectively contact the other of said first and second tubular portions when said first and second tubular portions move relative to each other in a direction generally perpendicular to the longitudinal axis of the axle from non-contacting positions to contacting positions, said rigid support projection being non-compressible.

17. The derailleur for a bicycle according to claim 16, wherein
said rigid support projection is integrally formed with one of said first and second tubular portions.

18. The derailleur for a bicycle according to claim 16, wherein
said one of said first and second tubular guide portions with said support projection includes an additional support projection.

19. The derailleur for a bicycle according to claim 18, wherein
each of said support projections includes a convex contact surface that selectively contacts the tubular portion that is absent of said support projections.

20. The derailleur for a bicycle according to claim 19, wherein
each of said support projections is elongated to form a linear contact point that selectively contacts the tubular portion that is absent of said support projections.

21. The derailleur for a bicycle according to claim 20, wherein
said linear contact points of said support projections are parallel to each other.

22. The derailleur for a bicycle according to claim 21, wherein
said linear contact points of said projections are circumferentially spaced less than about twenty-five degrees apart from each other.

23. The derailleur for a bicycle according to claim 21, wherein
said second tubular portion includes a concave inner surface, and
said first tubular portion includes a convex outer surface with said support projections extending therefrom, said linear contact points of said support projections being longitudinally arranged to selectively contact said concave inner surface of said second tubular portion.

24. The derailleur for a bicycle according to claim 21, wherein
said first tubular portion includes a convex outer surface, and
said second tubular portion includes a concave inner surface with said support projections extending therefrom, said linear contact points of said support projections being longitudinally arranged to selectively contact said convex outer surface of said first tubular portion.

25. The derailleur for a bicycle according to claim 21, wherein
said adjustment member includes a screw operatively coupled between a first tab of said first tubular portion and a second tab of said second tubular portion, said screw having a center axis parallel to said longitudinal axis of said corresponding one of said axles.

26. The derailleur for a bicycle according to claim 25, wherein
each of said linear contact points of said support projections is circumferentially spaced between about forty degrees and about seventy degrees from said center axis of said screw as measured about said longitudinal axis of said corresponding one of said axles.

27. The derailleur for a bicycle according to claim 19, wherein
said second tubular portion includes a concave inner surface, and
said first tubular portion includes a convex outer surface with said support projections extending therefrom, each of said convex contact surfaces of said support projections having a smaller radius of curvature than said concave inner surface of said second tubular portion.

28. The derailleur for a bicycle according to claim 16, wherein
said first tubular portion includes said support projection.

29. The derailleur for a bicycle according to claim 16, wherein
said second tubular portion includes said support projection.

30. The derailleur for a bicycle according to claim 16, wherein
said one of said members includes an inner tubular guide portion arranged on said corresponding one of said axles, said inner tubular guide portion having a radial width smaller than a radial width of said first tubular portion.

31. The derailleur for a bicycle according to claim 16, wherein
said movable member has said adjustment mechanism.

32. The derailleur for a bicycle according to claim 16, wherein
said base member has said adjustment mechanism.

* * * * *